(12) United States Patent
Sugimori

(10) Patent No.: US 8,345,123 B2
(45) Date of Patent: Jan. 1, 2013

(54) IMAGE SENSING APPARATUS, REGISTRATION APPARATUS, AND CONTROL METHOD AND PROGRAM THEREFOR

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 12/575,636

(22) Filed: Oct. 8, 2009

(65) Prior Publication Data

US 2010/0103284 A1    Apr. 29, 2010

(30) Foreign Application Priority Data

Oct. 27, 2008   (JP) ................................ 2008-275923

(51) Int. Cl.
*H04N 9/73* (2006.01)
*G02B 7/02* (2006.01)

(52) U.S. Cl. ..................... 348/231.1; 359/819

(58) Field of Classification Search ............. 348/208.6, 348/208.1, 208.12, 211.1–211.3, 231.3, 231.7, 348/231.8; 396/55, 85; 359/819
See application file for complete search history.

(56) References Cited

U.S. PATENT DOCUMENTS

| | | | |
|---|---|---|---|
| 6,816,625 B2 * | 11/2004 | Lewis et al. ................. 382/275 |
| 7,260,322 B2 * | 8/2007 | Ide et al. ........................ 396/71 |
| 2006/0152599 A1 * | 7/2006 | Yokonuma et al. ...... 348/231.99 |
| 2008/0111900 A1 * | 5/2008 | Numako et al. ............ 348/240.2 |
| 2008/0247744 A1 * | 10/2008 | Une et al. ...................... 396/310 |
| 2010/0045802 A1 * | 2/2010 | Oda et al. ................... 348/207.2 |

FOREIGN PATENT DOCUMENTS

| | | |
|---|---|---|
| JP | 2002-199410 | 7/2002 |
| JP | 2006-267770 | * 3/2005 |
| JP | 2005-175575 A | 6/2005 |
| JP | 2006-191282 A | 7/2006 |
| JP | 2006-267770 | 10/2006 |
| JP | 2008-096907 A | 4/2008 |

OTHER PUBLICATIONS

Sep. 28, 2012 Japanese Office Action, a copy of which is enclosed without an English Translation, that issued in Japanese Patent Application No. 2008-275923.

* cited by examiner

*Primary Examiner* — Trung Diep
(74) *Attorney, Agent, or Firm* — Cowan, Liebowitz & Latman, P.C.

(57) ABSTRACT

A lens unit 1 acquires identification information for an attached lens unit from the lens unit and stores the acquired identification information in a second memory 37. In a case in which correction information for the stored identification information is not registered, a CPU 36 reads the correction information for the stored identification information out from an external memory 39 and registers it.

7 Claims, 9 Drawing Sheets

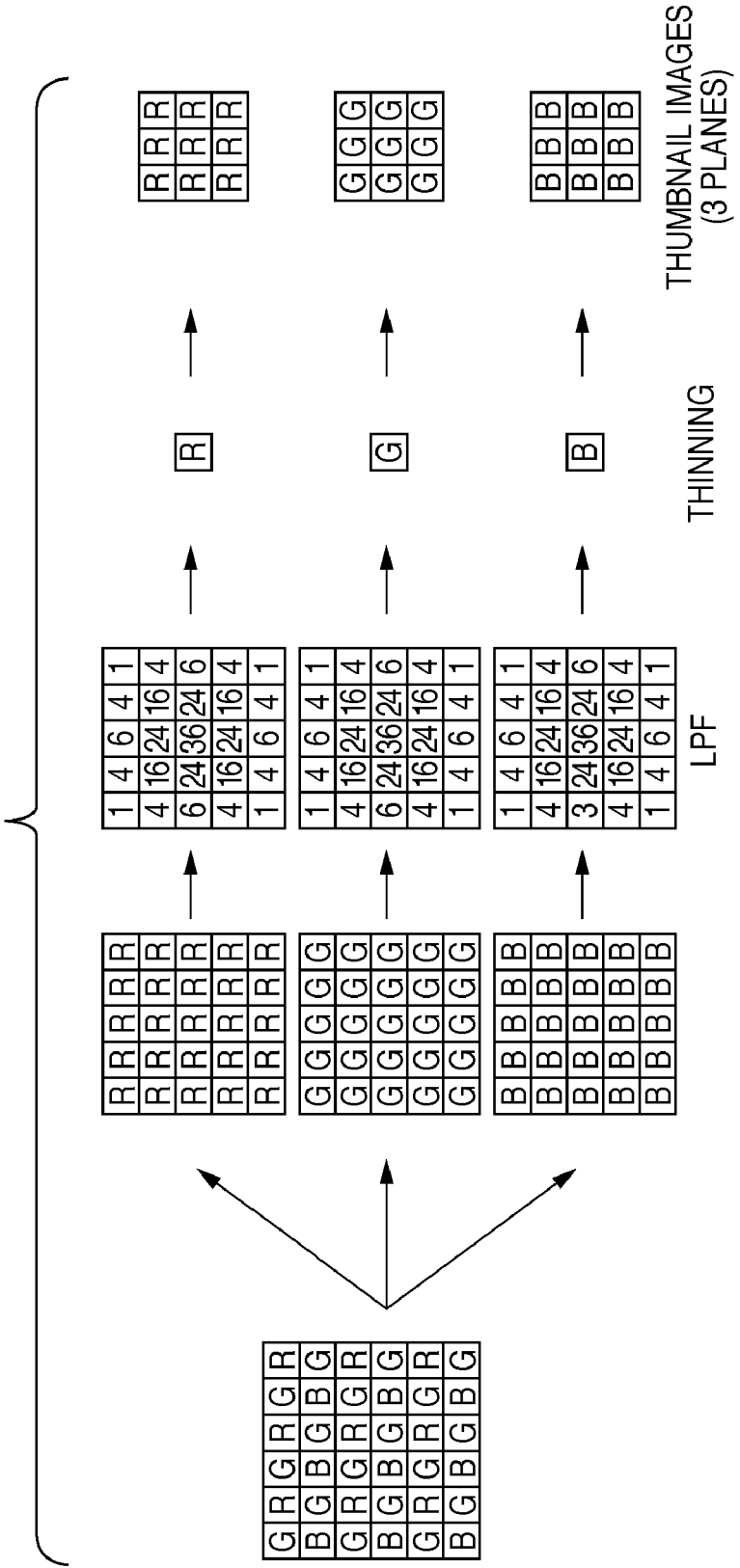

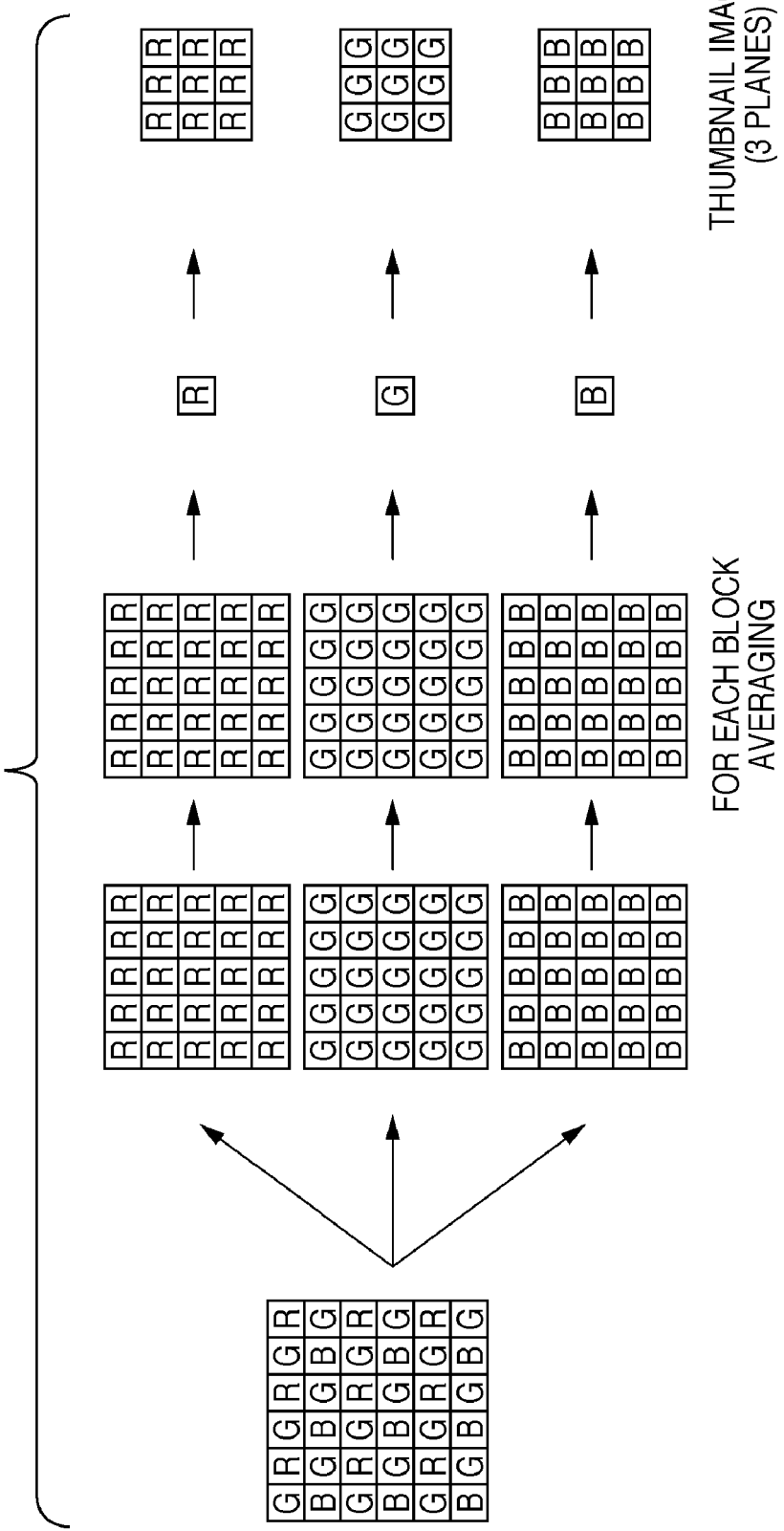

IMAGE SENSING APPARATUS, REGISTRATION APPARATUS, AND CONTROL METHOD AND PROGRAM THEREFOR

BACKGROUND OF THE INVENTION

1. Field of the Invention

The present invention relates to an image sensing apparatus, a registration apparatus, and a control method and program therefore.

2. Description of the Related Art

The quality of a sensed image of an image sensing apparatus largely depends on the optical characteristics of the lens unit attached at the time of image sensing. The optical characteristics of the lens unit that affects the quality of the sensed image include, for example, magnification chromatic aberration, distortion aberration, and decreased marginal illumination. Conventionally, in image sensing apparatuses capable of image processing of sensed images, such as digital still cameras and the like, there are some that carry out correction according to the optical characteristics of the lens unit described above. Japanese Patent Laid-Open No. 2002-199410 discloses photoelectrically converting incident light striking an image sensor into analog signals and further into digital signals using A/D conversion, after which optical system image degradation is corrected.

Since lens unit optical characteristics are different for every model, it is necessary to register correction information for the model of lens unit to be attached in the image sensing apparatus. As a technology that registers such correction information in the image sensing apparatus, that which is described in Japanese Patent Laid-Open No. 2006-267770 is known. Japanese Patent Laid-Open No. 2006-267770 discloses an image sensing apparatus that receives from the lens unit that is attached to the apparatus main unit information unique to that lens unit, and through a computer network acquires correction information corresponding to that unique information.

In the above-described conventional art, during the time in which the image sensing apparatus is connected to the computer network and is capable of registering correction information, only correction information relating to the lens unit that is attached to the apparatus main unit is registered. Therefore, when registering correction information for a plurality of lens units, it is necessary to change the lens unit that is attached to the image sensing apparatus during that time when the apparatus can register correction information, thus complicating registration.

SUMMARY OF THE INVENTION

The present invention has been made in consideration of the above situation, and provides an image sensing apparatus, a registration apparatus, and a control method and program therefore capable of carrying out registration of lens unit correction information with ease.

According to the present invention, provided is an image sensing apparatus including a correction unit that corrects a sensed image based on correction information for an attached lens unit registered in advance in a correction information storage unit, in which the lens unit is detachable, the image sensing apparatus comprising: an acquisition unit that acquires identification information for an attached lens unit from the attached lens unit; a storage unit that stores the identification information acquired by the acquisition unit; a connection unit that connects to an external device storing multiple pieces of correction information for different lens units by identification information; and a control unit that reads out correction information for the identification information stored in the storage unit from the external device and registers the read-out correction information in the correction information storage unit when the external device is connected to the image sensing apparatus by the connection unit.

According to another aspect of the present invention, provided is a control method for an image sensing apparatus including a correction unit that corrects a sensed image based on correction information for an attached lens unit registered in advance in a correction information storage unit, in which the lens unit is detachable, and a connection unit that connects to an external device storing multiple pieces of correction information for different lens units by identification information, the control method comprising: an acquisition step of acquiring identification information for an attached lens unit from the attached lens unit; a storage step of storing the identification information acquired in the acquisition step; and a control step of reading out correction information for the identification information stored in the storage step from the external device and registering the read-out correction information in the correction information storage unit when the external device is connected to the image sensing apparatus by the connection unit.

According to still another aspect of the present invention, provided is a registration apparatus that transmits by telecommunication correction information to be registered in a correction information storage unit to an image sensing apparatus, the image sensing apparatus including the correction information storage unit in which correction information for a lens unit/units is registered and an identification information storage unit that stores identification information for the attached lens unit, in which the lens unit is detachable, the registration apparatus comprising: a storage unit that stores multiple pieces of correction information of different lens units by identification information; and a control unit that communicates with the image sensing apparatus, reads out correction information for the identification information stored in the identification information storage unit from the storage unit, and transmits the read-out correction information to the image sensing apparatus as correction information to be registered when the registration apparatus is connected to the image sensing apparatus by telecommunication.

Further, according to another aspect of the present invention, provided is a control method for a registration apparatus that includes a storage unit that stores multiple pieces of correction information of different lens units by identification information, the correction information storage unit in which correction information for a lens unit/units is registered and an identification information storage unit that stores identification information for an attached lens unit, and that transmits by telecommunication correction information to be registered in a correction information storage unit to an image sensing apparatus in which the lens unit is detachable, the registration apparatus control method comprising a control step of communicating with the image sensing apparatus, reading out lens unit correction information for the identification information stored in the identification information storage unit from the storage unit, and transmitting the read-out correction information to the image sensing apparatus as correction information to be registered when the registration apparatus is connected to the image sensing apparatus by telecommunication.

Further features of the present invention will become apparent from the following description of exemplary embodiments (with reference to the attached drawings).

BRIEF DESCRIPTION OF THE DRAWINGS

FIGS. 3A and 3B are schematic diagrams illustrating examples of image processing by the image sensing apparatus according to the first embodiment;

DESCRIPTION OF THE EMBODIMENTS

Embodiments of the present invention are described below with reference to the accompanying drawings. The invention is not limited to the following embodiments, however. Moreover, the embodiments of the present invention are exemplary embodiments of the invention and do not limit the scope of the invention.

(First Embodiment)

Figure 1:
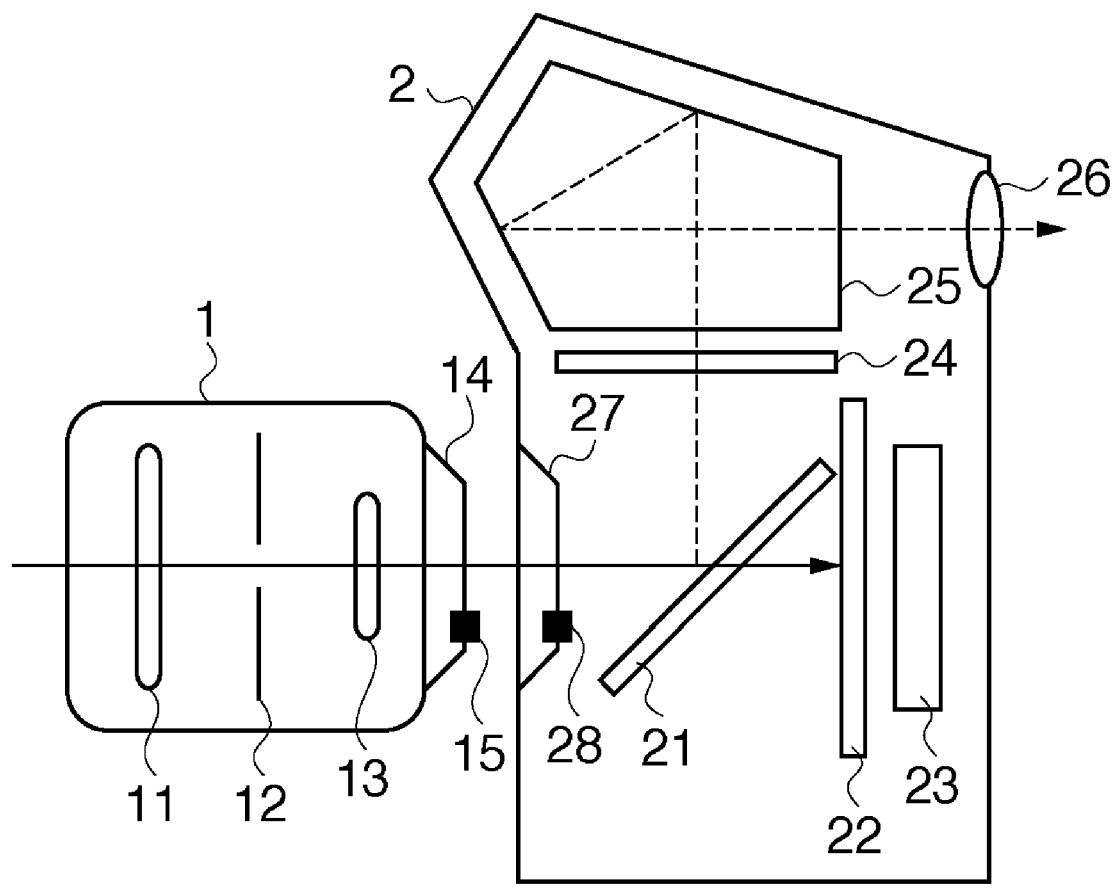
FIG. 1 is a schematic diagram of a lens unit and an image sensing apparatus according to a first embodiment.

A description is now given of a first embodiment. FIG. 1 is a schematic diagram of an image sensing apparatus 2 according to the present embodiment. As shown in FIG. 1, the image sensing apparatus 2 is an interchangeable lens-type digital still camera with a detachable lens unit 1.

The lens unit 1 typically has a zoom lens 11 for changing focal length, an aperture mechanism 12 for controlling brightness, and a focus lens 13 for focusing on the subject. In addition, the lens unit 1 has a mount portion 14 for connecting mechanically to a mount portion 27 of the image sensing apparatus 2, so that the lens unit 1 can be detachably attached to the image sensing apparatus 2 by screwing the lens unit 1 into the image sensing apparatus 2, for example.

The image sensing apparatus 2 reflects light that has passed through the lens unit 1 with a half mirror 21 and forms an image on a focusing screen 24. The light formed on the focusing screen 24 is inverted by a prism 25, passes through an eyepiece lens 26, and is viewed as an erect image by a user. During photography, the half mirror 21 pops up, a shutter 22 opens, and light that has passed through the lens unit 1 forms an image on an image sensor 23.

The mount portion 14 of the lens unit 1 incorporates contacts 15. These contacts 15 include terminals for receiving a supply of power from the image sensing apparatus 2 and terminals for exchanging data with the image sensing apparatus 2 (none of which is shown). More specifically, the contacts 15 are respectively assigned to several applications, such as power supply, ground, transmission, reception, clock, and the like. By connecting the lens unit 1 mount portion 14 to the image sensing apparatus 2 mount portion 27, connection terminals in the contacts 15 on the mount portion 14 and in the contacts 28 on the mount portion 27 are connected to each other. As a result, power is supplied to the lens unit 1 and data exchange between the lens unit 1 and the image sensing apparatus 2 is begun.

The lens unit 1 has a drive unit (not shown) such as a stepping motor or the like for driving the aperture mechanism 12 and the focus lens 13. Through exchanging data with the image sensing apparatus 2, driving of the aperture mechanism 12 and the focus lens 13 are controlled from the image sensing apparatus 2. In addition, the lens unit 1 has a ROM (not shown) storing identification information such as an identification number or lens ID that is uniquely assigned by individual lens unit or model for identifying the name, individual lens unit, and model of the lens unit 1. In the event that there has been a request for the above-described identification information though data exchange with the image sensing apparatus 2, the lens unit 1 sends the identification information stored in the ROM to the image sensing apparatus 2.

Figure 2:
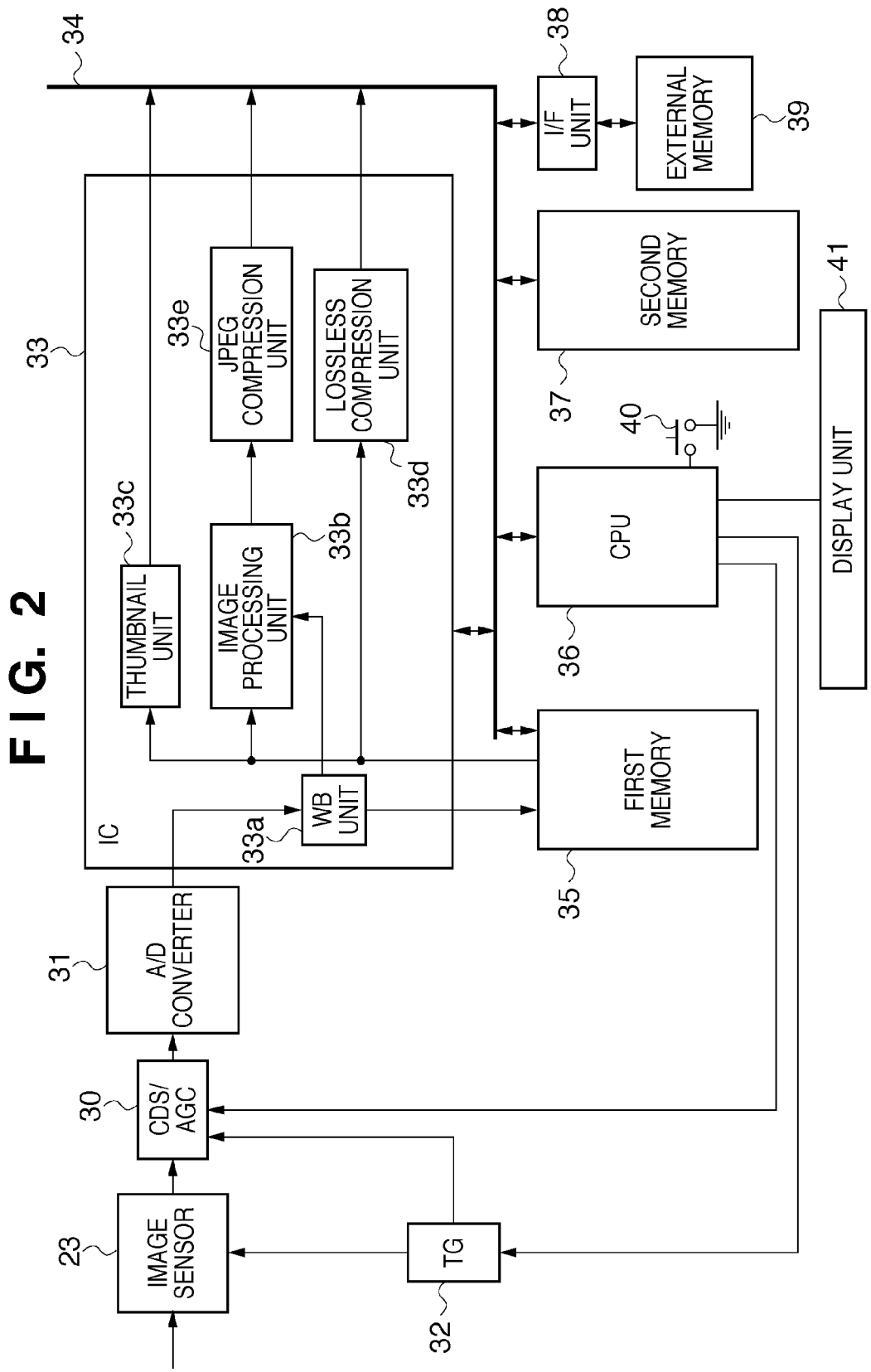
FIG. 2 is a block diagram of an internal configuration of the image sensing apparatus according to the first embodiment.

Next, a description is given of the internal configuration of the image sensing apparatus 2 with reference to FIG. 2.

The image sensor 23 is a CCD or CMOS image sensor or the like. The light formed on the image sensor 23 is converted into electrical charges at each of the pixels of the image sensor 23 in accordance with the quantity of incident light. Signals generated by a timing generator (TG) 32 drive the image sensor 23, forwarding the electrical charges accumulated in the pixels of the image sensor 23 and sequentially converting them into voltage signals. The converted voltage signals are then sampled and gain-adjusted at a CDS/AGC (Correlated Double Sampling/Automatic Gain Control) 30 and converted into digital signals by an A/D converter 31.

The image data converted into digital signals by the A/D converter 31 is input to an integrated circuit (IC) 33. The image data input to the IC 33, after input to a WB unit 33a that computes data for white balance, is temporarily stored in a first memory 35. The first memory 35 may be a RAM or the like.

The image data temporarily stored in the first memory 35 is once again input to the IC 33 and the following three types of image processing are carried out. First, the image data that is once again input to the IC 33 is converted into lossless-compressed RAW data at a lossless compression unit 33d that subjects the image data as is to lossless compression and sent to a bus 34. In addition, at a thumbnail unit 33c, for example as shown in FIG. 3A, the image data is passed through a low-pass filter and its bandwidth reduced. It is to be noted that, at the thumbnail unit 33c, as shown in FIG. 3B the image data may be averaged for each block and its bandwidth reduced. Then, the bandwidth-reduced image data is subjected to down-sampling by thinning, converted into a thumbnail image smaller in size than the original image, and sent to the bus 34. Finally, in order to produce JPEG (Joint Photographic Experts Group) compressed image data, predetermined image processing is carried out at an image processing unit 33b on the image data and the processed image data is converted into YCbCr data. The YCbCr data is raster-block converted, JPEG compressed at the JPEG compression unit 33e, and sent to the bus 34.

A CPU (Central Processing Unit) 36 centrally controls the operations of each part of the image sensing apparatus 2. More specifically, immediately after power to the image sensing apparatus 2 is switched on, the CPU 36 initializes all parts of the image sensing apparatus 2 in accordance with program data stored in the second memory 37 and commences communication with the lens unit 1. In addition, the CPU 36 temporarily stores sensed image data, which is image data that is output to the bus 34 after being subjected to image processing by the IC 33, in the first memory 35. Then, the CPU 36 reads out correction information for the lens unit that is attached during image sensing from among correction information for a plurality of lens units stored in the second memory 37 to be described later. Then, the CPU 36 corrects the image data stored in the first memory 35 based on the read-out correction information and ultimately stores it in an external memory 39 via an I/F unit 38. The second memory 37 is a semiconductor memory or the like that readably and writably stores data. In addition to the program data that the CPU 36 executes, the second memory 37 also pre-stores various types of setting data including correction information for a plurality of lens units.

In addition, a switch 40 is connected to the CPU 36, and the CPU 36 controls the parts of the image sensing apparatus 2 in response to instructions from the user that are input through the switch 40. For example, the switch 40 may be a release switch for accepting an instruction to shoot, operating switches for carrying out various settings, and so forth. The CPU 36, in response to the pressing of the release switch, carries out image sensing with the image sensor 23, and, after image processing by the IC 33, stores the sensed image data in the external memory 39.

The I/F unit 38 is an interface detachably connected to the external memory 39 for writing data to the attached external memory 39 or reading out data stored in the attached external memory 39. The external memory 39 is a recording medium such as a semiconductor memory or a HDD (Hard Disk Drive). It is to be noted that the I/F unit 38 may be a USB, IEEE1394, LAN port or other such interface communicably connected to an external device such as a PC, a data server on a network, or the like. In this case, the I/F unit 38 can write data to the external device and read data from the external device. It is to be noted that USB stands for Universal Serial Bus, and IEEE stands for Institute of Electrical and Electronic Engineers.

A display unit 41 is a display device such as a liquid crystal display (LCD) provided on a rear face of the image sensing apparatus 2, and displays images under the control of the CPU 36. By withdrawing the half mirror 21 from the light path and displaying image data sequentially sensed by the image sensing sensor 23, for example, the display unit 41 can provide electronic viewfinder (EVF) display. In addition, the display unit 41, under the control of the CPU 36, displays operating screens when carrying out various settings using the operating switches of the switch 40.

Figure 4:
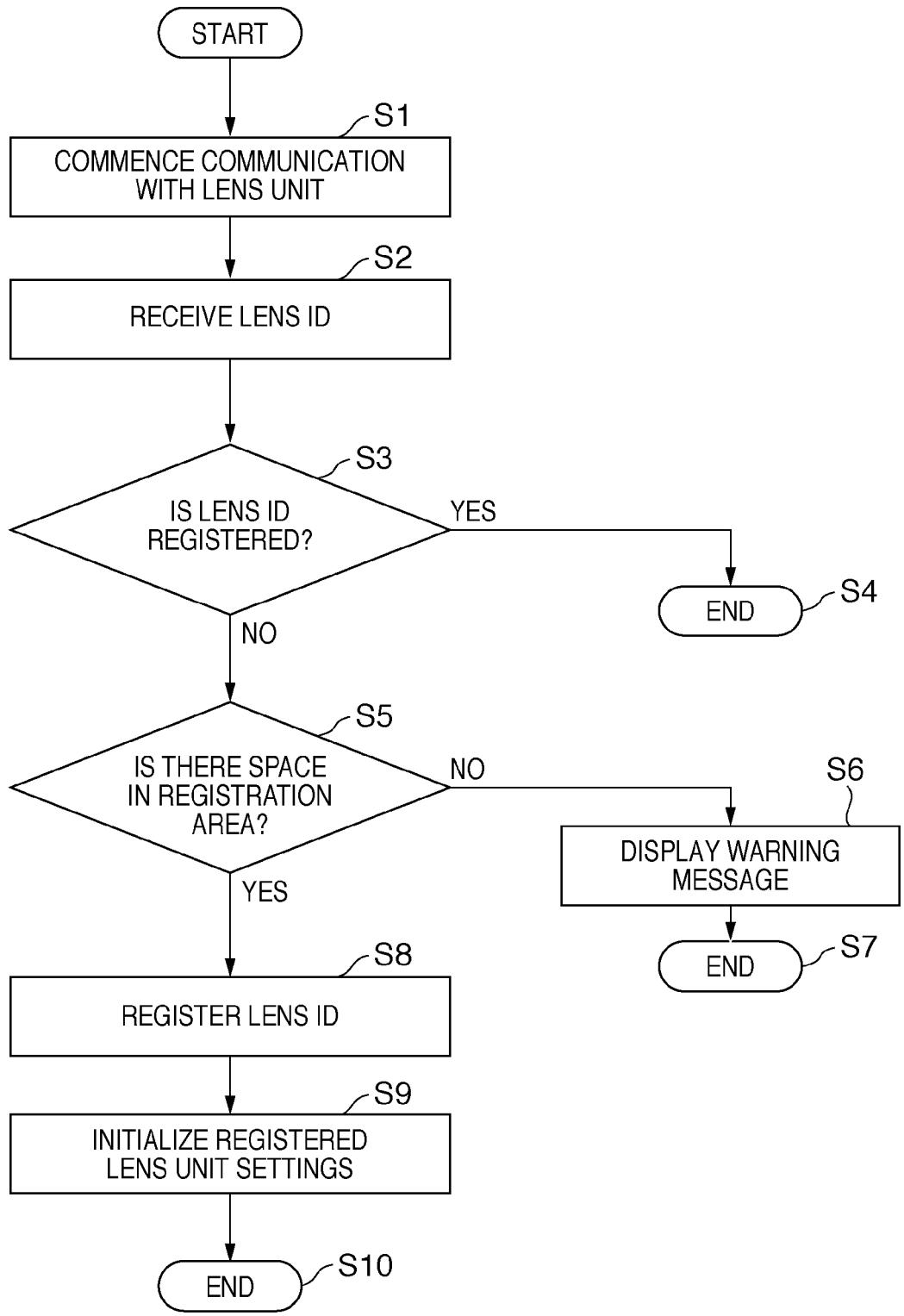
FIG. 4 is a flowchart illustrating processing by the image sensing apparatus according to the first embodiment.

Next, a description is given of processing performed by the CPU 36 of the image sensing apparatus 2 when the lens unit 1 is attached to the image sensing apparatus 2, with reference to FIG. 4. When the CPU 36 detects attachment of the lens unit 1 by connection of the contacts 28 and the contacts 15, the CPU 36 commences exchanging data between the lens unit 1 and the image sensing apparatus 2 (step S1). Then, in step S2, the CPU 36 receives lens ID and other such identification information from the lens unit 1.

Then, the CPU 36 determines whether or not the received lens ID is already registered in the second memory 37 of the image sensing apparatus 2 (step S3). In step S3, if the received ID is already registered, the CPU 36 ends this process without registering the lens ID in the second memory 37 (step S4). On the other hand, if in step S3 the received ID is not registered, then the CPU 36 determines whether or not there is space in the registration area of the second memory 37 to store the received lens ID (step S5).

In step S5, if there is no space in the registration area, the CPU 36 causes the display unit 41 to display a warning message indicting that the registration area is full and there is no space to register the lens ID of the attached lens unit (step S6). After display of the warning message, the CPU 36 ends the process (step S7).

If in step S5 there is space in the registration area, the CPU 36 registers history information including the received lens ID in the registration area of the second memory 37 (step S8). It is to be noted that, in the present embodiment, in step S8, although the received lens ID and lens name are registered as history information in the registration area of the second memory 37, it is sufficient if the lens ID is contained in the history information. Next, the CPU 36 initializes settings related to the newly attached lens unit (step S9) and ends the process (step S10).

A brief description is now given of the data that is stored in the registration area of the second memory 37. The following Table 1 shows table data containing information relating to the lens unit that is stored in the registration area.

TABLE 1

| LENS ID | LENS NAME | DL | ON/OFF | MAGNIFICATION | AXIAL | MARGINAL | DISTORTION |
|---|---|---|---|---|---|---|---|
| ID-100 | LENS28-200 f3.5-5.6 USM | 1 | ON | 100 | 100 | 100 | 100 |
| ID-111 | LENS14 mm F2.8L USM | 1 | ON | 100 | 100 | 80 | 100 |
| ID-015 | LENS85 mm F1.2L II USM | 1 | ON | 100 | 100 | 0 | 0 |
| ID-200 | LENS-S18-55 mm F3.5-5.6 | 1 | OFF | 100 | 100 | 100 | 0 |
| ID-003 | LENS28 mm F1.8 USM | 1 | ON | 100 | 100 | 100 | 0 |
| ID-035 | LENS100-400 mm F45-5.6L IS USM | 0 | OFF | 0 | 0 | 0 | 0 |

As shown in Table 1, the table data relating to the lens unit stored in the registration area is composed of lens ID, lens name, DL, ON/OFF, magnification, on axis, periphery, and distortion as line components, and the lens units as column components. Therefore, a variety of lens unit information can be registered in the table data by lens ID and lens name. Moreover, the number of lines in the table data is limited in advance based on the capacity of the second memory 37 and the like. Therefore, in step S6, it is determined whether or not lens IDs and lens names are registered up to the previously limited maximum number of lines.

In the table data, in S3 shown in FIG. 4 the data acquired from the attached lens unit is distinguished by lens ID and lens name so as not to be redundant and sequentially stored. The magnification, axis, periphery, and distortion comprise the lens unit correction information, and more specifically amount of correction by each of a plurality of optical characteristics (magnification chromatic aberration, axial chromatic aberration, decreased marginal illumination, and distortion aberration, in that order). ON/OFF is setting information for setting whether or not to carry out correction of a sensed image using correction information. DL is a flag that indicates whether or not downloading and acquisition of correction information corresponding to the lens ID and lens name acquired from the attached lens unit is finished, shown as a numeric value of either 0 or 1 (O: acquisition incomplete, 1: acquisition completed). It is to be noted that, in step S9, initialized data (0, OFF, NULL value, etc.) is stored for the DL, ON/OFF, magnification, axial, marginal, and distortion for a lens ID and lens name newly registered in step S8.

In the example of Table 1, 6 types of lens units are registered in the image sensing apparatus 2. However, with respect to the last registered lens unit, the DL and the setting information and the correction information have been initialized in step S9. In other words, although it can be seen from the lens name and lens ID that the lens unit is registered as a lens unit, the DL that is the flag that shows that correction information has been stored is 0, and 0 (or OFF or NULL value) is set for the setting information and for the correction information. For all the other registered lens units, setting information and correction information have been stored and the DL flag is 1.

Thus, as described above, correction information for the attached lens unit is registered in the registration area of the second memory 37. In addition, by storing the DL flag as 0 in the registration area of the second memory 37, history information that includes identification information acquired from the attached lens unit is stored. It is to be noted that it is not necessary that the history information and the correction information for the attached lens unit be stored in the same registration area, and alternatively, they may be stored in separate storage devices or separate storage areas.

Figure 5:
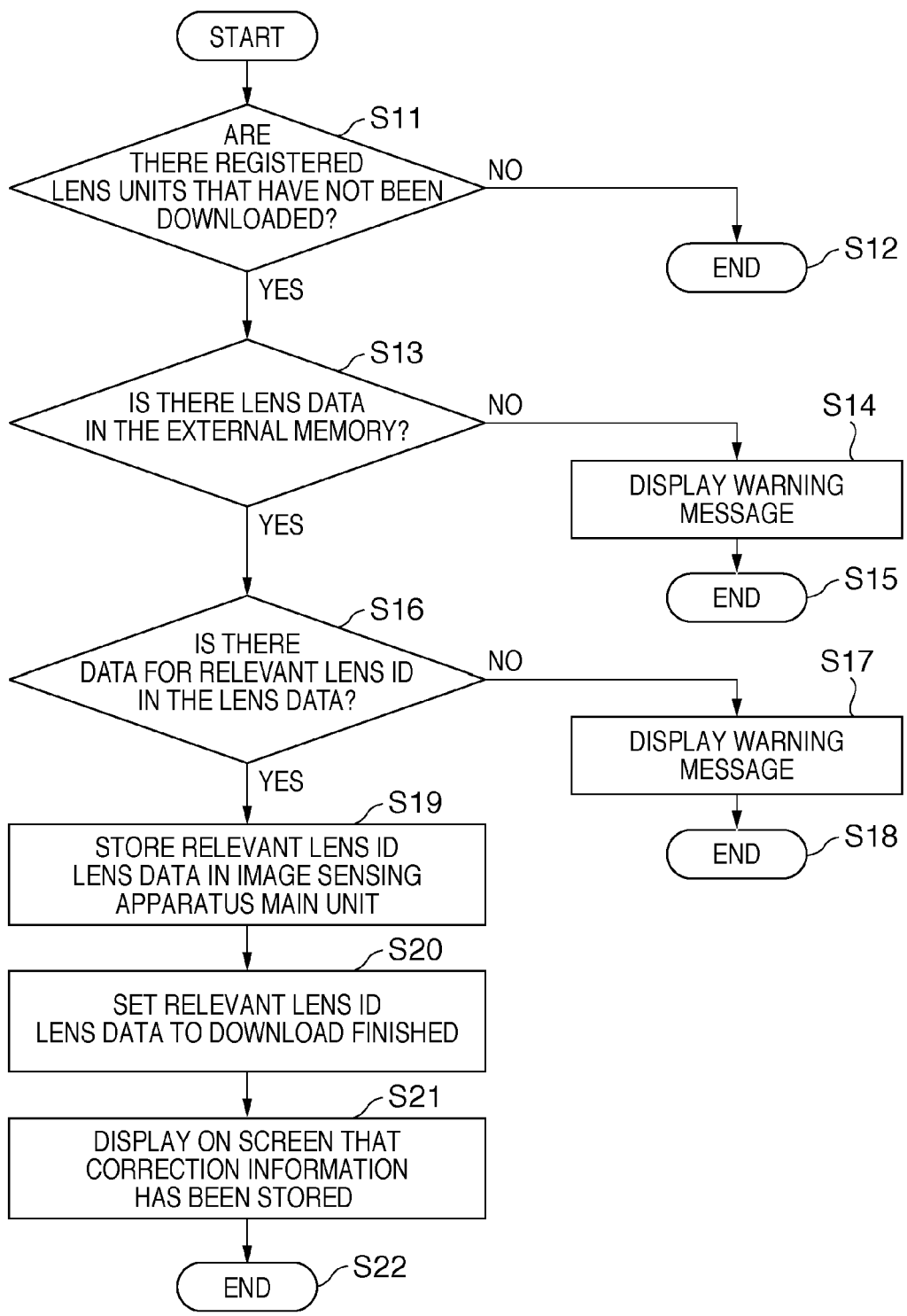
FIG. 5 is a flowchart illustrating processing by the image sensing apparatus according to the first embodiment.

Next, with reference to FIG. 5, a description is given of the process of registering lens data stored in the external memory 39 in the image sensing apparatus 2, which is a process that the CPU 36 carries out when the external memory 39 is connected to the image sensing apparatus 2. The flowchart shown in FIG. 5 illustrates steps in a process executed by the CPU 36 when the external memory 39 is connected to the image sensing apparatus 2 at the time of turning off the image sensing apparatus 2. It is to be noted that the process illustrated by the flowchart shown in FIG. 5 is such that, so long as the process is carried out when the external memory 39 is connected to the image sensing apparatus 2, the process may be executed not when turning off the image sensing apparatus 2 but when turning on the image sensing apparatus 2. Moreover, although the present embodiment illustrates a case in which the external memory 39, which is a recording medium, is connected to the image sensing apparatus 2, it goes without saying that the process is the same also in a case in which an external device is connected.

In step S11, the CPU 36 determines whether or not, of the registered lens units, there are those for which correction information has not been downloaded to the second memory 37, which it determines by checking the above-described DL flag. That is, in step S11, the CPU 36 determines whether or not correction information for lens units with registered lens IDs has been registered. If in step S11 all the DLs for the registered lens units are 1 and the registered lens unit correction information has all been downloaded (NO), the CPU 36 ends the process (step S12).

However, if in step S11 there is a lens unit with a DL of 0 and correction information has not been downloaded, the CPU 36 determines whether or not lens data storing a variety of information by lens unit is contained in the external memory 39 (step S13). The lens data is file data or the like storing a variety of information including correction information by lens name and lens ID. For example, the lens data may be CSV (Comma Separated Value) format file data, with a variety of information (lens name, lens ID, correction information) relating to a single lens unit in one line separated by commas, with multiple pieces of lens unit correction information stored by identification information extending over multiple lines. In other words, in step S13, the CPU 36 determines whether or not at least a single piece of lens unit correction information is contained in the external memory 39.

If in step S13 it is determined that no lens data is contained in the external memory 39, the CPU 36 causes the display unit 41 to display for several seconds a warning message to the effect that no lens data is contained in the external memory 39 (step S14). More specifically, since no lens data is contained in the external memory 39, the CPU 36 causes the display unit 41 to display for several seconds a message such as "There are lens units registered for which correction information has not been downloaded." This warning message display enables the user to ascertain that lens units for which no correction information has been downloaded are registered in the image sensing apparatus 2. Then, the CPU 36 ends the process (step S15).

Alternatively, if in step S13 it is determined that lens data is contained in the external memory 39, the CPU 36 determines whether or not correction information for the lens ID of the lens unit for which correction information has not been downloaded is included in that lens data (S16).

If in step S16 there is no correction information for the lens ID included in the lens data (NO), the CPU 36 causes the display unit 41 to display for several seconds a warning message to the effect that correction information for the lens ID is not included in the lens data (step S17). More specifically, since no correction information for the lens ID is included in the lens data, the CPU 36 causes the display unit 41 to display for several seconds a message such as "There is no correction information. Please update the file." This warning message display enables the user to ascertain that correction information for the lens unit that is registered in the image sensing apparatus 2 cannot be registered with the lens data that is in the external memory 39, and that it is necessary to update the lens data. Then, the CPU 36 ends the process (step S18).

On the other hand, if in step S16 correction information for the lens ID is included in the lens data, the CPU 36 stores that correction information in the second memory 37 as correction information for the lens ID (step S19). More specifically, in step S19 correction information is registered in the line of the lens ID in the table data described above. It is to be noted that even if there is correction information for the lens ID in the lens data in the external memory 39 that has not yet been registered in the second memory 37, the CPU 36 does not store that correction information in the second memory 37. This is because if correction information for a lens unit that has never been attached to the image sensing apparatus 2 is stored in the second memory 37 there is a strong possibility that space in the registration area of the second memory 37 will be needlessly decreased. Then, the CPU 36 rewrites the DL flag for that lens ID to 1, to show that download is complete (step S20). Then, the CPU 36 causes the display unit 41 to display for several seconds a message such as "Lens unit correction information storage complete." (step S21), and ends the process (step S22).

Figure 6:
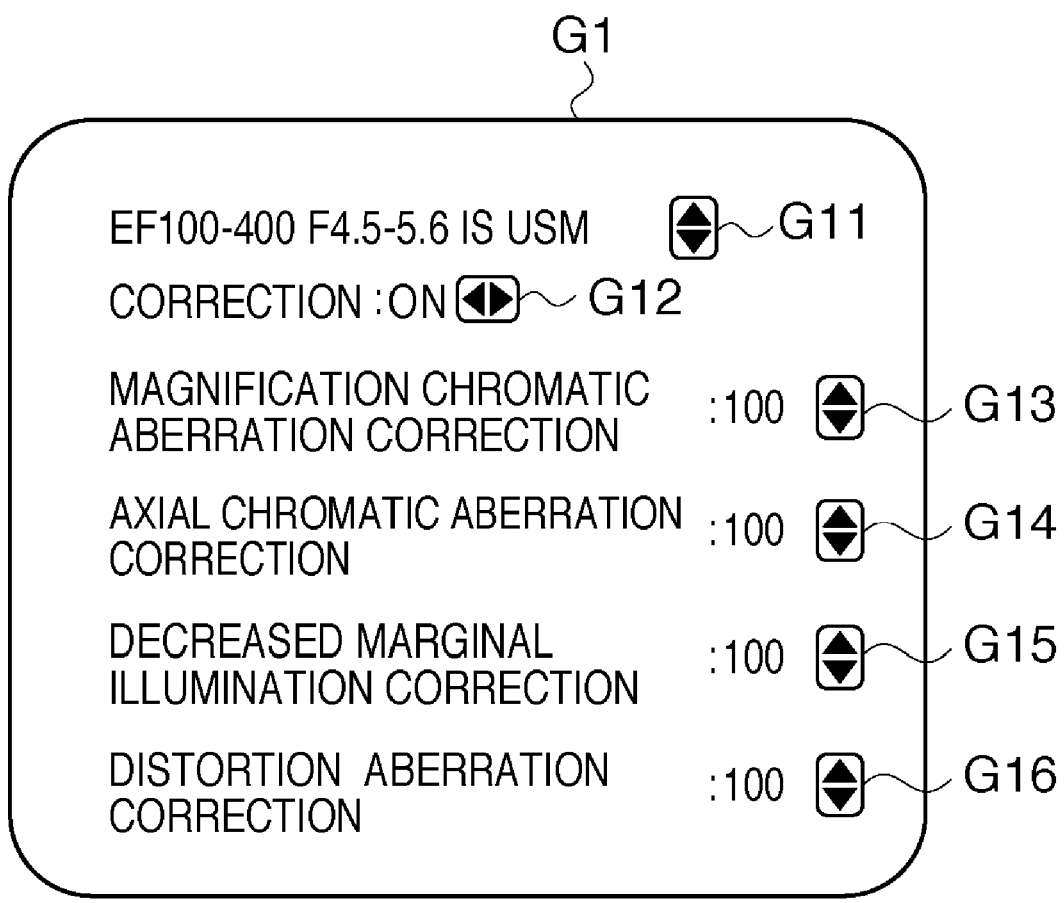
FIG. 6 is a diagram illustrating an example of a user interface according to the first embodiment.

Next, with reference to FIG. 6, a description is given of a user interface that receives from the user settings for each lens unit for which correction information is downloaded, and setting whether or not to carry out correction using that correction information. FIG. 6 shows an example of a setting screen G1 displayed on the display unit 41.

The setting screen G1 is a screen that is displayed on the display unit 41 by the CPU 36 sequentially executing user interface program data stored in the second memory 37. When the setting screen G1 is displayed on the display unit 41, the CPU 36 through the switch 40 receives operating instructions from the user. On the setting screen G1, lens names registered in the second memory 37 can be selected using the selection button G11, with setting information and correction information relating to the selected lens name being read out from the second memory 37 and displayed. A setting button G12 queries the user and sets the ON/OFF as to whether or not to carry out correction of a sensed image using the correction information. A setting button G13 queries the user as to the amount of correction relating to magnification chromatic aberration correction in the correction information and receives correction instructions from the user. A setting button G14 queries the user as to the amount of correction relating to axial chromatic aberration correction in the correction information and receives correction instructions from the user. A setting button G15 queries the user as to the amount of correction relating to decreased marginal illumination correction in the correction information and receives correction instructions from the user. A setting button G16 queries the user as to the amount of correction relating to distortion aberration correction in the correction information and receives correction instructions from the user.

Using the above-described setting screen G1, at the image sensing apparatus 2 various settings are implemented with respect to the correction information for the lens unit selected with the selection button G11 from among the lens units registered in the second memory 37, using the setting buttons G12 through G16. In addition, the setting results obtained with the setting screen G1 are reflected as setting information and correction information for the lens units registered in the second memory 37.

Thus, as described above, at the image sensing apparatus 2, a lens unit for which correction information has been downloaded can be selected using the user interface that displays the setting screen G1 on the display unit 41 and receives user operating instructions from the switch 40. Moreover, for the lens unit selected using the user interface, it is possible to select an item that turns all the correction functions ON/OFF, that is, it is possible to select whether or not to carry out correction using correction information. In addition, in a case in which the correction function is switched ON, the amount of correction of individual correction items, which are magnification chromatic aberration correction, axial chromatic aberration correction, decreased marginal illumination correction, distortion aberration correction, and so on can be individually adjusted to appropriate amounts. It is to be noted that, in a case in which the correction function is switched OFF, reception of operation of the setting buttons G13-G16 may be disabled. When carrying out image sensing using a lens unit for which correction information is set with the user interface shown as an example in FIG. 6, the user can correct the sensed image by a desired amount of correction, and store the corrected image in the external memory 39.

(Second Embodiment)

In the first embodiment, the image sensing apparatus 2 automatically reads out correction information of a lens unit from the external memory 39 and registers the read-out correction information. A second embodiment is described using as an example a method of registering from an external device such as a PC or the like connected to the image sensing apparatus 2, as another method of registering lens unit correction information in the image sensing apparatus 2. It is to be noted that, in the following description, elements of the image sensing apparatus 2 that are the same as those of the first embodiment are given the same reference numerals and redundant description thereof is omitted.

Figure 7:
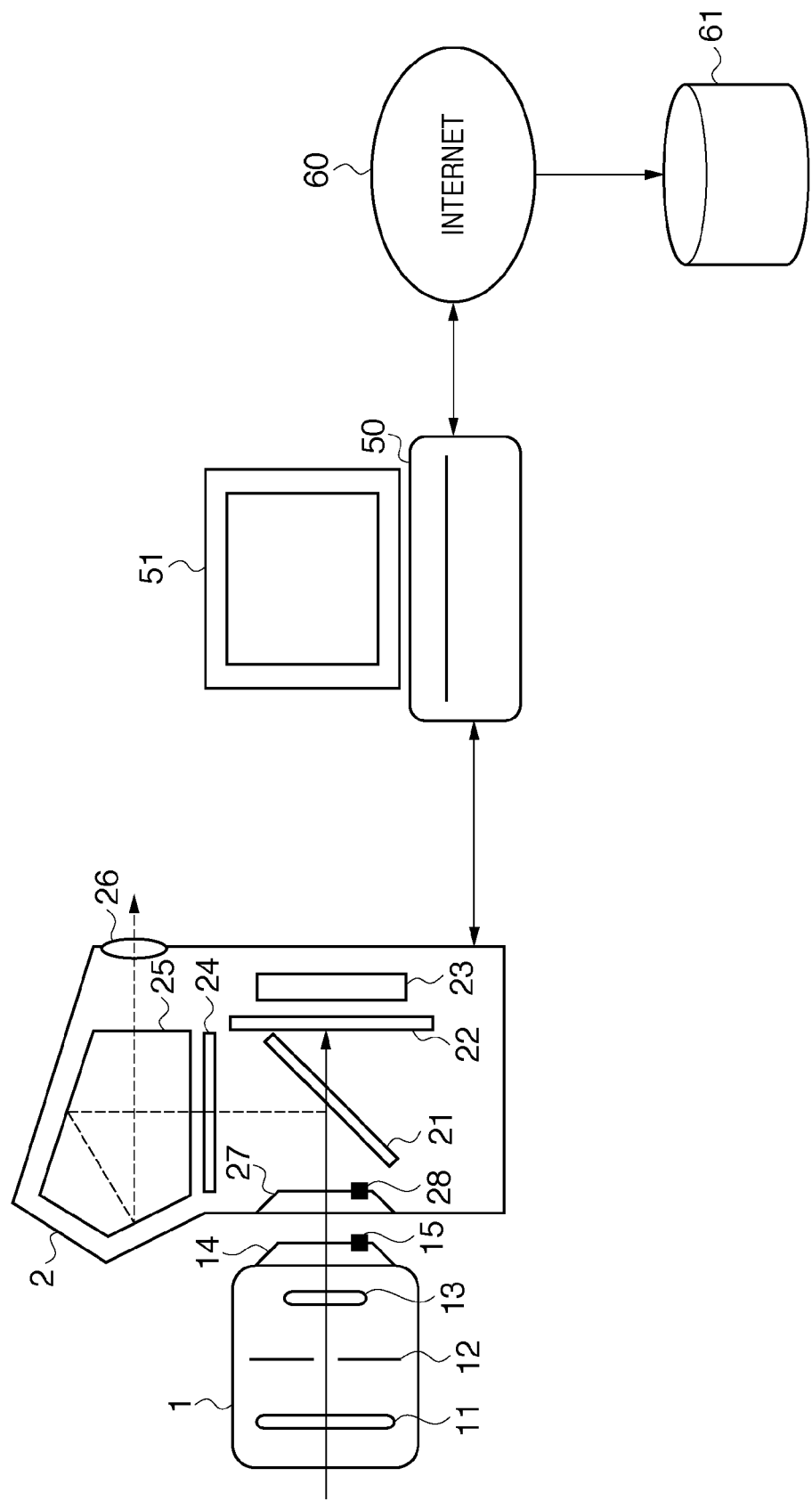
FIG. 7 is a schematic diagram illustrating a system configuration according to a second embodiment.

FIG. 7 is a schematic diagram illustrating a system configuration according to the second embodiment. As shown in FIG. 7, in this second embodiment the image sensing apparatus 2 is connected to a registration apparatus 50 through the above-described I/F unit 38. The registration apparatus 50 is a PC or other such information device, and has a CPU, ROM, RAM, operating devices such as a keyboard and a mouse, and a communications interface for exchanging data with other devices (none of which is shown). By the CPU securing operating areas in the RAM and sequentially executing program data stored in the ROM, the registration apparatus 50 performs various types of data processing in response to instructions from a user input through the operating devices. A display device 51 such as an LCD is connected to the registration apparatus 50 through a communications interface, enabling display of operating screens, data processing results, and the like on the display device 51.

The registration apparatus 50 communicates with the image sensing apparatus 2 through the communications interface and can obtain data stored in the image sensing apparatus 2. More specifically, the registration apparatus 50 exchanges data with the image sensing apparatus 2 through a communications interface such as a USB or the like, and can obtain data corresponding to Table 1 stored in the second memory 37. In addition, the recording apparatus 50 is connectable to the internet 60 through a communication interface. Accordingly, by specifying an IP address or the like at the registration apparatus 50 and specifying a data server 61 connected to the internet 60, it is possible to download data stored on the data server 61. Alternatively, the registration apparatus 50 may be connectable to a storage device or other recording medium through a communications interface, and download data stored on the recording medium. It is to be noted that, in the second embodiment, the registration apparatus 50 downloads data stored on the data server 61.

The data server 61 is for example a storage device containing lens data for all lens units, providing lens data to devices from which there is a request (clients) over the internet 60. Therefore, whereas in the first embodiment lens data containing lens unit correction information was downloaded from an external memory, in this second embodiment lens data can be downloaded from the data server 61.

Figure 8:
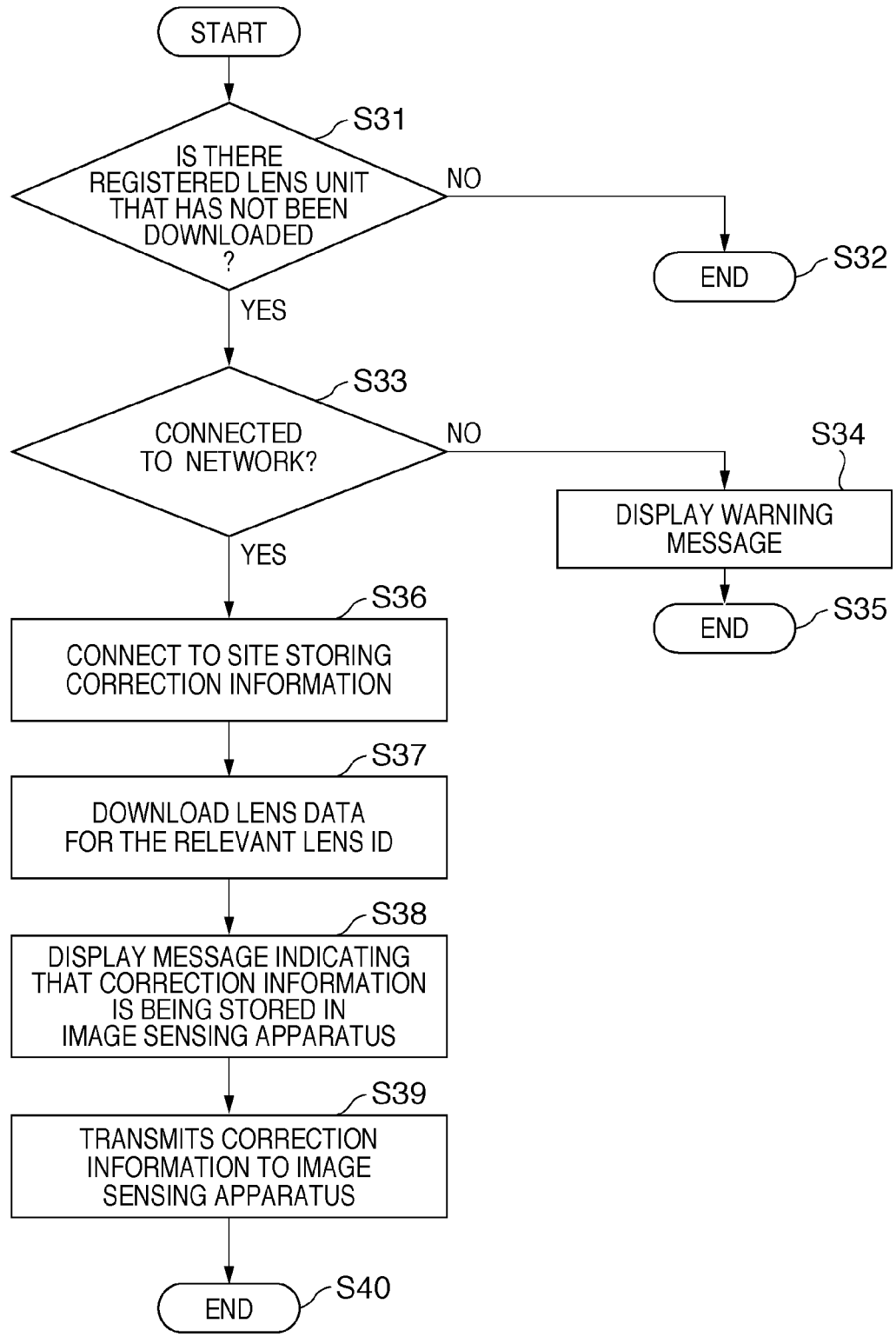
FIG. 8 is a flowchart illustrating processing by a registration apparatus according to a second embodiment.

Next, with reference to FIG. 8, a description is given of the process of transmitting correction information to be registered in the image sensing apparatus 2 from the registration apparatus 50 in order to register correction information in the image sensing apparatus 2, which is a process that the CPU of the registration apparatus 50 carries out sequentially. It is to be noted that this process is carried out when the CPU of the registration apparatus 50 detects connection with the image sensing apparatus 2, and is commenced, for example, by specifying execution of a program for diagnosing the image sensing apparatus 2 when the image sensing apparatus 2 is connected.

As shown in FIG. 8, when processing is commenced, the CPU of the registration apparatus 50 acquires data corresponding to Table 1 stored in the image sensing apparatus 2 and determines whether or not, of the lens units registered in the image sensing apparatus 2, there are those for which correction information has not been downloaded (step S31). If in step S31 correction information has been downloaded for all the registered lens units (NO), the CPU displays a message such as "No correction information to be added." on the display device 51 and ends the diagnostic program (step S32).

If in S31 there are lens units registered for which correction information has not been downloaded, the CPU determines whether or not the registration apparatus 50 is connected to the internet 60 (step S33). In step S33, if the registration apparatus 50 is not connected to the internet 60, the CPU displays a warning message such as "Please connect to the internet to download correction information." on the display device 51 (step S34). Then, the CPU ends the diagnostic program (step S35).

If in step S33 the registration apparatus 50 is connected to the internet 60, the CPU connects the registration apparatus 50 to the data server 61 that is a predetermined connection address containing correction information, using an IP address or the like preset in the diagnostic program (step S36). Then, the CPU downloads lens data for the lens ID of the lens unit, for which no correction information has been downloaded, from the data server 61 to the RAM or the like (step S37).

It is to be noted that, in step S37, the CPU may carry out the same processes as those of steps S13-S18 in the first embodiment based on the lens data downloaded to the RAM. In this case, in the event that the downloaded lens data does not satisfy the determinations of step S13 or S16, the same warning messages as in steps S14 and S17 are displayed on the display device 51.

Then, the CPU causes the display unit 51 to display an indication to the effect that the correction information included in the lens data downloaded from the data server 61 is being registered in the image sensing apparatus 2 (step S38). Then, the CPU transmits the correction information included in the lens data downloaded form the data server 61 to the image sensing apparatus 2 as correction information to be registered, and registers it in the second memory (step S39). Then, the CPU displays a message such as "Correction information update completed." on the display unit 51 and ends the diagnostic program (step S40).

It is to be noted that when the CPU of the registration apparatus 50 transmits correction information to the image sensing apparatus 2 in step S39, a user interface like that shown in FIG. 6 may be provided by sequentially executing the above-described user interface program data. More specifically, various settings relating to the correction information to be transmitted to the image sensing apparatus 2 may be carried out by displaying the above-described setting screen G1 on the display unit 51 and receiving user instructions from the operating devices. In this case, as with the user interface in the image sensing apparatus 2, the user can register correction information that corrects the sensed image by a desired correction amount in the image sensing apparatus 2.

Although in the second embodiment the registration apparatus 50 is configured to download lens data from the data server 61, the source of the lens data is not limited to the data server 61. For example, the registration apparatus 50 may be configured to read out lens data from a storage device built into the apparatus or from an external memory connected through an interface.

While the present invention has been described with reference to exemplary embodiments, it is to be understood that the invention is not limited to the disclosed in exemplary embodiments. The scope of the following claims is to be accorded the broadest interpretation so as to encompass all such modifications and equivalent structures and functions.

This application claims the benefit of Japanese Patent Application No. 2008-275923, filed on Oct. 27, 2008, which is hereby incorporated by reference herein in its entirety.

What is claimed is:

1. An image sensing apparatus including a correction unit that corrects a sensed image based on correction information for an attached lens unit registered in advance in a correction information storage unit, in which the lens unit is detachable, the image sensing apparatus comprising:
    an acquisition unit that acquires identification information for an attached lens unit from the attached lens unit and, if the acquired identification information is different from identification information which has been acquired previously, registers in the correction information storage unit the acquired identification information and a flag indicating that correction information for the acquired identification information is not registered in the correction information storage unit;
    a connection unit that connects to an external device storing multiple pieces of correction information for different lens units by identification information; and
    a control unit that, in a case where the external device is connected to the image sensing apparatus and the flag exists, reads out correction information for the identification information corresponding to the flag from the external device, registers the read-out correction information in the correction information storage unit, and changes the flag to a flag indicating that the correction information has been registered in the correction information storage unit.

2. The image sensing apparatus according to claim 1, further comprising a display unit,
    wherein the control unit determines whether or not at least one piece of the correction information is stored in the external device connected by the connection unit, and in a case in which there is no such correction information stored, displays a warning message on the display unit indicating that no such correction information is stored.

3. The image sensing apparatus according to claim 1, further comprising a display unit,
    wherein the control unit determines whether or not correction information for the flag indicating that the correction information is not stored is stored in the external device connected by the connection unit, and in a case in which there is no such correction information stored, displays a warning message on the display unit indicating that no such correction information is stored.

4. The image sensing apparatus according to claim 1, further comprising a user interface that receives user instructions,
    wherein a correction amount for correcting a plurality of optical characteristics of the lens unit is set in the correction information,
    wherein the control unit changes the correction amount set in the correction information registered in the correction information storage unit based on a user instruction received from the user interface.

5. The image sensing apparatus according to claim 1, wherein the external device is a recording medium detachably attachable to the connection unit or a data server communicably connectible to the connection unit.

6. A control method for an image sensing apparatus including a correction unit that corrects a sensed image based on correction information for an attached lens unit registered in advance in a correction information storage unit, in which the lens unit is detachable, and a connection unit that connects to an external device storing multiple pieces of correction information for different lens units by identification information, the control method comprising:
    an acquisition step of acquiring identification information for an attached lens unit from the attached lens unit and, if the acquired identification information is different from identification information which has been acquired previously, registering in the correction information storage unit the acquired identification information and a flag indicating that correction information for the acquired identification information is not registered in the correction information storage unit; and
    a control step of, in a case where the external device is connected to the image sensing apparatus and the flag exists, reading out correction information for the identification information corresponding to the flag from the external device, registering the read-out correction information in the correction information storage unit, and changing the flag to a flag indicating that the correction information has been registered in the correction information storage unit.

7. A non-transitory computer-readable medium including a program stored thereon, the program when executed by an information processing apparatus causing the information processing apparatus to perform the control method as set forth in claim 6.

* * * * *